(12) United States Patent
Kim et al.

(10) Patent No.: US 11,341,305 B2
(45) Date of Patent: May 24, 2022

(54) METHOD OF PREDICTING SHAPE OF SEMICONDUCTOR DEVICE

(71) Applicant: SAMSUNG ELECTRONICS CO., LTD., Suwon-si (KR)

(72) Inventors: Kwang-Hoon Kim, Yongin-si (KR); Do-Yun Kim, Gwacheon-si (KR); Ki-Wook Song, Hwaseong-si (KR); Sung-Bo Shim, Hwaseong-si (KR); Ji-Hye Lee, Suwon-si (KR); Dong-Chul Ihm, Suwon-si (KR); Woo-Young Cheon, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 536 days.

(21) Appl. No.: 16/433,266

(22) Filed: Jun. 6, 2019

(65) Prior Publication Data

US 2020/0201952 A1   Jun. 25, 2020

(30) Foreign Application Priority Data

Dec. 19, 2018   (KR) .................. 10-2018-0165467

(51) Int. Cl.
  *G01N 21/95*   (2006.01)
  *G06F 30/367*  (2020.01)
  *H01L 21/66*   (2006.01)
  *G06F 30/398*  (2020.01)

(52) U.S. Cl.
  CPC ....... *G06F 30/367* (2020.01); *G01N 21/9501* (2013.01); *G06F 30/398* (2020.01); *H01L 22/12* (2013.01)

(58) Field of Classification Search
  CPC .. G06F 30/367; G06F 30/398; G06F 2111/10; G06F 2119/18; G01N 21/9501; H01L 22/12; H01L 22/20; H01L 21/02; H01L 27/0203; Y02P 90/02
  USPC .................................................. 703/14, 13, 1
  See application file for complete search history.

(56) References Cited

U.S. PATENT DOCUMENTS

| | | | | |
|---|---|---|---|---|
| 5,655,110 A | * | 8/1997 | Krivokapic | ...... G05B 19/41875 700/95 |
| 5,966,527 A | * | 10/1999 | Krivokapic | ........... G06F 30/367 703/14 |
| 7,324,193 B2 | * | 1/2008 | Lally | .................. G01N 21/9501 356/237.2 |
| 7,912,679 B2 | * | 3/2011 | Li | .......................... G03F 7/705 702/189 |

(Continued)

*Primary Examiner* — Juan C Ochoa
(74) *Attorney, Agent, or Firm* — Myers Bigel, P.A.

(57) ABSTRACT

A method of predicting a shape of a semiconductor device includes implementing a modeled semiconductor shape with respect to a designed semiconductor layout, extracting a plurality of samples by independently linearly combining process variables with respect to the modeled semiconductor shape; generating virtual spectrums with respect to ones of the extracted plurality of samples through optical analysis, indexing the virtual spectrums to produce indexed virtual spectrums, generating a shape prediction model by using the indexed virtual spectrums as an input and the modeled semiconductor shape as an output, and indexing a spectrum measured from a manufactured semiconductor device and inputting the spectrum to the shape prediction model to predict a shape of the manufactured semiconductor device.

20 Claims, 10 Drawing Sheets

(56) References Cited

U.S. PATENT DOCUMENTS

| | | | |
|---|---|---|---|
| 8,666,703 B2 | 3/2014 | Ferns et al. | |
| 9,916,965 B2 | 3/2018 | Bhaskar et al. | |
| 10,572,697 B2 * | 2/2020 | Feng | G03F 1/78 |
| 10,712,145 B2 * | 7/2020 | Chen | G01N 21/9501 |
| 2007/0249071 A1 * | 10/2007 | Lian | G01B 11/0625 |
| | | | 438/16 |
| 2013/0110477 A1 | 5/2013 | Pandev | |
| 2017/0018069 A1 | 1/2017 | Vaid et al. | |
| 2018/0112968 A1 | 4/2018 | Chen et al. | |
| 2018/0211891 A1 | 7/2018 | Veerasingam | |
| 2020/0193290 A1 * | 6/2020 | Cho | H01L 22/20 |

* cited by examiner

METHOD OF PREDICTING SHAPE OF SEMICONDUCTOR DEVICE

CROSS-REFERENCE TO RELATED APPLICATION

This application claims the benefit of Korean Patent Application No. 10-2018-0165467, filed on Dec. 19, 2018, in the Korean Intellectual Property Office, the disclosure of which is incorporated herein in its entirety by reference.

PARTIES TO A JOINT RESEARCH AGREEMENT

The claimed invention was made by, or on behalf of, the below listed parties to a joint research agreement. The parties to the joint research agreement are Samsung Electronics Co., Ltd. And Korea Advanced Institute of Science and Technology.

BACKGROUND

The inventive concept relates to a shape prediction method of a semiconductor device, and more particularly, to a method of predicting a shape of a semiconductor device by predicting changes in a manufacturing process of a semiconductor device.

According to the remarkable progress in the electronics industry and user's demands, electronic devices are becoming more compact and lightweight, and thus complicated manufacturing processes are applied to achieve a higher integration of a semiconductor device, which may be a key component of an electronic device.

While each stage of the complicated manufacturing processes involves process changes, to analyze the shape of a semiconductor device according to the process changes, a large number of analysis samples, high costs, and/or a long time may be needed for destructive analysis of the analysis samples.

SUMMARY

The inventive concept provides a shape prediction method of a semiconductor device, in which a shape of a semiconductor device according to a process change is predicted.

According to some embodiments, there is provided a method of predicting a shape of a semiconductor device, the method includes implementing a modeled semiconductor shape with respect to a designed semiconductor layout, extracting a plurality of samples by independently linearly combining process variables with respect to the modeled semiconductor shape, generating virtual spectrums with respect to ones of the plurality of samples that were extracted through optical analysis, indexing the virtual spectrums, generating a shape prediction model by using the indexed virtual spectrums as an input and the modeled semiconductor shape as an output, and indexing a spectrum measured from a manufactured semiconductor device and inputting the spectrum that was measured to the shape prediction model to predict a shape of the manufactured semiconductor device.

According to some embodiments, there is provided a method of predicting a shape of a semiconductor device. The method includes designing a designed semiconductor layout, selecting a shape determining process from the designed semiconductor layout, manufacturing a sample semiconductor device by using the designed semiconductor layout, implementing a modeled semiconductor shape through simulation of a physical thin film deposition operation and simulation of an etching operation with respect to the designed semiconductor layout, extracting a plurality of samples with respect to the modeled semiconductor shape, generating virtual spectrums corresponding to the shape determining process that was selected, with respect to ones of the plurality of samples that were extracted through optical analysis, indexing the virtual spectrums, generating a shape prediction model by performing learning by using the virtual spectrums that were indexed as an input and the modeled semiconductor shape as an output, correcting the shape prediction model by comparing compatibility between a shape of the sample semiconductor device predicted by indexing the spectrum measured from the sample semiconductor device and input to the shape prediction model, and a sample shape measured from the sample semiconductor device, and indexing a spectrum measured from a manufactured semiconductor device and inputting the spectrum to the shape prediction model to predict a shape of the manufactured semiconductor device.

According to some embodiments, there is provided a method of predicting a shape of a semiconductor device. The method includes manufacturing a sample semiconductor device by using a designed semiconductor layout, for which a shape determining process is selected, implementing a modeled semiconductor shape through simulation of a physical thin film deposition operation and simulation of an etching operation with respect to the designed semiconductor layout, extracting, with respect to the modeled semiconductor shape, a plurality of samples which is more than a number of manufactured sample semiconductors by at least one order, through an independent linear combination of process variables in the shape determining process, generating a shape prediction model by performing learning by using, as an input, indexed virtual spectrums with respect to ones of the plurality of samples that were extracted, and the modeled semiconductor shape as an output, and indexing a spectrum measured from a manufactured semiconductor device and inputting the indexed spectrum to the shape prediction model to predict a shape of the manufactured semiconductor device.

BRIEF DESCRIPTION OF THE DRAWINGS

Embodiments of the inventive concept will be more clearly understood from the following detailed description taken in conjunction with the accompanying drawings in which.

DETAILED DESCRIPTION

Hereinafter, example embodiments of the inventive concept will be described in detail with reference to the accompanying drawings. It is noted that aspects of the inventive concept described with respect to one embodiment, may be incorporated in a different embodiment although not specifically described relative thereto. That is, all embodiments and/or features of any embodiment can be combined in any way and/or combination. These and other objects and/or aspects of the present inventive concept are explained in detail in the specification set forth below. As used herein, the term "and/or" includes any and all combinations of one or more of the associated listed items. Expressions such as "at least one of," when preceding a list of elements, modify the entire list of elements and do not modify the individual elements of the list.

Figure 1:
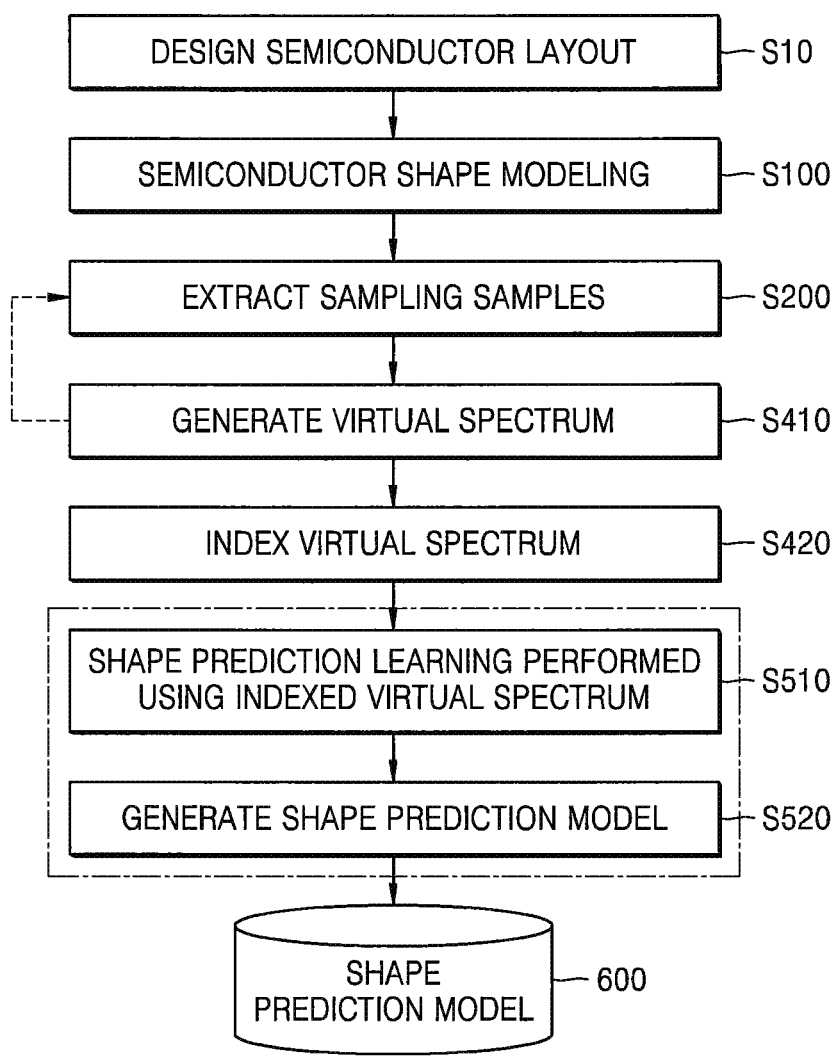
FIG. 1 is a flowchart of a process of generating a shape prediction model used in a shape prediction method of a semiconductor device, according to some embodiments of the inventive concept.

FIG. 1 is a flowchart of a process of generating a shape prediction model used in a shape prediction method of a semiconductor device, according to some embodiments of the inventive concept. Referring to FIG. 1, a semiconductor layout is designed to generate a shape prediction model 600 for predicting a shape of a semiconductor device (S10). The designed semiconductor layout may be generated, for example, in a Graphic Database System II (GDSII) stream format (hereinafter referred to as "GDSII"). The semiconductor layout designed may be, for example, a mask layout.

A semiconductor device may be, for example, a fin field-effect transistor (FinFET) semiconductor device, a dynamic random access memory (DRAM) semiconductor device, a NAND semiconductor device, a VNAND semiconductor device, and/or the like, but is not limited thereto.

Semiconductor shape modeling is performed based on the designed semiconductor layout (S100). Semiconductor shape modeling may be performed using, for example, Technology Computer Aided Design (TCAD). In semiconductor shape modeling, process TCAD modeling a manufacturing process of a semiconductor device may be used, but the embodiments described herein are not limited thereto. Device TCAD modeling an operation of a semiconductor device may also be used in combination, in some embodiments. For example, a TCAD tool for performing TCAD may be Synopsys, Silvaco, Crosslight, Cogenda SoftwarelVisualTCAD, Global TCAD Solutions, or Tiberlab.

Semiconductor shape modeling may be performed through simulation of a physical thin film deposition operation and simulation of an etching operation based on a semiconductor layout, to implement a modeled semiconductor shape. Here, a semiconductor shape is a concept encompassing a structure such as the arrangement of components of a semiconductor device, numerical values of the components of the semiconductor device (for example, a thickness of a thin film, a depth of a portion removed by an etching operation, physical properties of materials included, etc.), and may also be referred to as a target spec. The numerical values of the components do not only refer to fixed constants but may also indicate process variables that may be selected or modified during simulation of a physical thin film deposition operation and/or simulation of an etching operation.

A plurality of samples may be extracted by combining process variables used in simulation of a physical thin film deposition operation and simulation of an etching operation with respect to a modeled semiconductor shape implemented through semiconductor shape modeling (S200). For example, a plurality of samples may be extracted through an independent linear combination of process variables used in simulation of a physical thin film deposition operation and simulation of an etching operation. For example, a plurality of samples may be extracted through Latin Hypercube Sampling (LHS). A method of extracting a plurality of samples through LHS will be described in detail with reference to FIG. 5.

A plurality of samples may be extracted by combining process variables used in simulation of some selected process steps, instead of combining process variables used in simulation of all process steps. Process steps and process variables selected to extract a plurality of samples may be process steps and process variables that are dominant in determining a semiconductor shape. In some embodiments, process steps selected to extract a plurality of samples may include a thin film deposition operation of forming material layers that form components of a completed semiconductor device, an etching operation of removing a portion of the formed material layers or a chemical mechanical polishing (CMP) process. Process variables may include a deposition time of a thin film deposition operation, and/or a thickness of a thin film formed as a result of the thin film deposition operation, an etching time of an etching operation and/or an etching thickness which is a result of the etching operation, a process time of a CMP process and/or a thickness of a removed portion or a thickness of a remaining portion, which may be a result of the CMP process.

The extracted plurality of samples may be a plurality of modeled semiconductor shapes that are implemented through semiconductor shape modeling with respect to other process variables. For example, the extracted plurality of samples may be a plurality of modeled semiconductor shapes implemented through semiconductor shape modeling performed by varying a thickness of a thin film, a deposition time of the thin film, an etching depth or an etching time, or the like.

A virtual spectrum is generated with respect to each of the extracted plurality of samples through optical analysis (S410). A virtual spectrum may be generated in the form of a spectrum measured using a scatterometer, such as, for example, spectroscopic ellipsometry or spectroscopic reflectometry.

A virtual spectrum may be generated by performing optical analysis on process steps selected from each of the extracted plurality of samples. That is, with respect to one extracted sample, a plurality of virtual spectrums may be generated by performing optical analysis on a structure on which each of the selected process steps is performed.

For example, spectroscopic ellipsometry may be used to measure a 3D shape of a nanopattern of a semiconductor device. Incident light may be diffracted in a positive order and a negative order, and light diffracted in a zeroth order may be collected by spectroscopic ellipsometry. The collected light is a combination of two elements that are linearly polarized and have a phase difference between p-polarized light and s-polarized light. Here, a polarization mode in which an electric field is in a direction parallel to a diffracting grating direction is referred to as a TE mode, and a polarization mode in which an electric field is in a direction perpendicular to a direction of a diffraction grating is referred to as a TM mode.

A virtual spectrum may be generated, for example, by performing an operation through rigorous coupled wave analysis (RCWA), which is a Fourier space analysis method of a finite-difference frequency-domain (FDFD). In some embodiments, virtual spectrums with respect to a plurality of samples may be generated by performing RCWA in parallel.

By indexing the virtual spectrums (S420), input values to be used in shape prediction learning are generated. A virtual spectrum may be indexed by using Fast Fourier Transform (FFT) or principal component analysis (PCA).

In some embodiments, by performing FFT on virtual spectrums, one largest peak and/or two or more relatively large peaks may be selected to index the virtual spectrums. In other embodiments, a virtual spectrum may be indexed by performing PCA on virtual spectrums and detecting principal components of the spectrum thereof.

By using the indexed virtual spectrums as an input and using a modeled semiconductor shape obtained through semiconductor shape modeling, i.e., a target spec, as an output, shape prediction learning may be performed (S510) to generate a shape prediction model 600 (S520) and store the same.

For example, by using values obtained by indexing virtual spectrums generated in selected process steps of each of the extracted plurality of samples, as an input, and a target spec of the selected process steps of each of the extracted plurality of samples, as an output, machine learning or deep learning may be performed to generate a shape prediction model 600 (S520).

Figure 2:
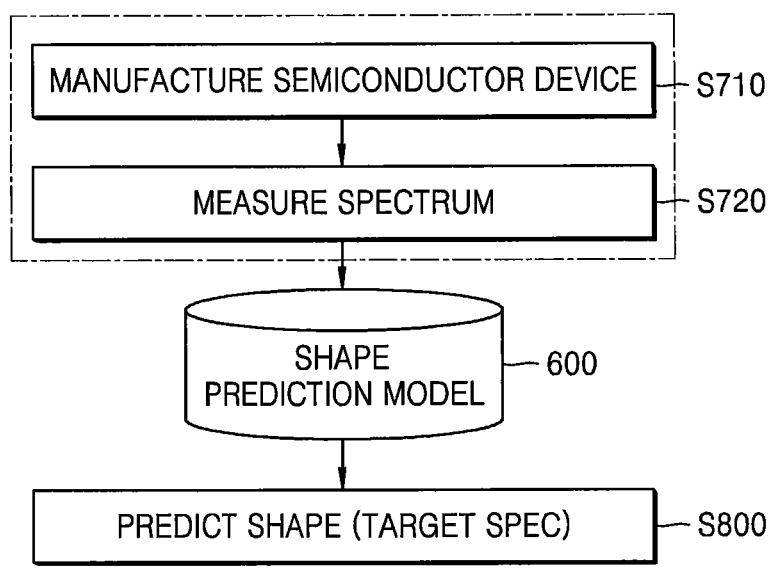
FIG. 2 is a flowchart of a process of performing a shape prediction method by using a shape prediction model generated in a shape prediction method of a semiconductor device, according to some embodiments of the inventive concept.

FIG. 2 is a flowchart of a process of performing a shape prediction method by using a shape prediction model generated in a shape prediction method of a semiconductor device, according to some embodiments of the inventive concept.

Referring to FIG. 2, a semiconductor device is manufactured (S710). In selected ones from process steps of manufacturing a semiconductor device, a spectrum of a sample is measured (S720). A spectrum may be measured using a scatterometer, such as spectroscopic ellipsometry or spectroscopic reflectometry. By inputting the measured spectrum to the shape prediction model 600, a target spec, which is a shape of a semiconductor device, may be predicted (S800). Measured spectrums may be indexed and input to the shape prediction model 600. A method of indexing measured spectrums may be substantially the same as the method of indexing a virtual spectrum described with reference to FIG. 1 (S420). Predictable target specs may include some or all values measureable in each manufacturing process of a semiconductor device, and may be, for example, physical properties such as a thickness of a thin film, a depth of holes or trenches, a thickness or a width of a pattern, a refractive index, a permittivity, reflectance, and/or the like.

For example, during a manufacturing process of a semiconductor device, a spectrum of a sample is measured after performing an operation of depositing a thin film, and a value obtained by indexing the measured spectrum may be input to the shape prediction model 600 to predict a target spec such as a thickness of a thin film.

For example, when a semiconductor device is a FinFET semiconductor device, an etching operation for forming a fin may be performed, and then a spectrum of a sample may be measured and input to the shape prediction model 600 to predict a target spec such as a height of the fin or a width of the fin (or a depth and width of a trench around the fin) and/or the like. In some embodiments, an etching operation may be performed before forming source and drain regions, and then a spectrum of a sample may be measured and input to the shape prediction model 600 to predict a target spec such as an etching depth and width.

For example, when a semiconductor device is a DRAM semiconductor device, an operation of etching to form a trench to form a shallow trench insulator (STI) to define an active region may be performed, and then a spectrum of a sample may be measured and input to the shape prediction model 600 to predict a target spec such as a depth of a trench, a width of the trench, and/or a long-axis length or a short-axis length of the active region. In some embodiments, after performing an operation of etching a gate trench to form a buried cell array transistor (BCAT), a spectrum of a sample may be measured and input to the shape prediction model 600 to predict a target spec such as a depth and/or a width of the gate trench and/or the like.

For example, when a semiconductor device is a NAND semiconductor device, an etching operation for forming a gate line may be performed. A spectrum of a sample may be measured and input to the shape prediction model 600 to predict a target spec such as a height and/or a width of the gate line and/or the like.

For example, when a semiconductor device is a VNAND semiconductor device, an etching operation for forming a channel hole may be performed. A spectrum of a sample may be measured and input to the shape prediction model 600 to predict a target spec such as a depth and/or a width of the channel hole and/or the like.

Figure 3:
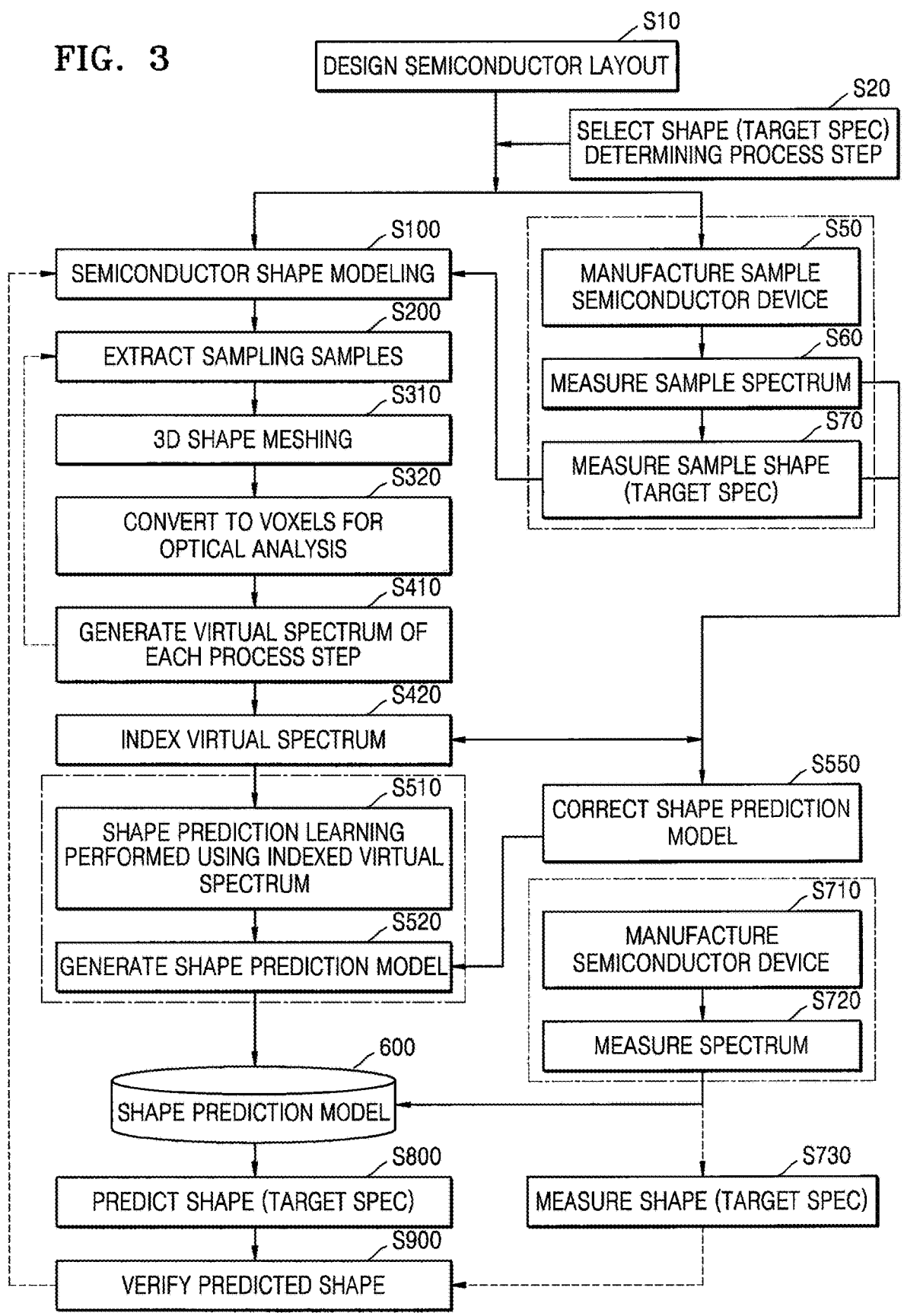
FIG. 3 is a flowchart of a process of performing a shape prediction method of a semiconductor device, according to some embodiments of the inventive concept.

FIG. 3 is a flowchart of a process of performing a shape prediction method of a semiconductor device, according to some embodiments of the inventive concept.

Referring to FIG. 3, a semiconductor layout is designed to generate a shape prediction model 600 for predicting a shape of a semiconductor device (S10). Shape determining process steps, which are dominant in determining a semiconductor shape (target spec) of the designed semiconductor layout, are selected (S20). Examples of the shape determining process steps may include a thin film deposition operation of forming a material layer, in which each component is formed, an etching operation of removing a portion of the material layer and/or a CMP process.

By using the designed semiconductor layout, a sample semiconductor device may be manufactured (S50). In a process of manufacturing a sample semiconductor device, a sample spectrum may be measured in each of the shape determining process steps (S60), and a sample shape (target spec) of a sample semiconductor device may be measured (S70). A sample spectrum may be measured using a scatterometer such as spectroscopic ellipsometry or spectroscopic reflectometry. A sample shape of a sample semiconductor device may be measured using, for example, a transmission electron microscope (TEM), a scanning electron microscope (SEM), an atomic force microscope (AFP) and/or the like. A sample shape of a sample semiconductor device may include numerical values indicating a 3D shape of a sample semiconductor device such as a bottom critical dimension (BCD), a middle CD, a top CD, a profile height, a sidewall angle, and/or the like. In some embodiments, a sample shape regarding a sample semiconductor device may be automatically measured from an actual image obtained via TEM, SEM, AFM, or the like.

Semiconductor shape modeling is performed based on the designed semiconductor layout (S100). Semiconductor modeling may be performed through simulation of a physical thin film deposition operation and simulation of an etching operation based on the designed semiconductor layout, to implement a modeled semiconductor shape. In some embodiments, in a process of implementing a semiconductor shape modeled by performing semiconductor shape modeling (S100), a sample shape of a sample semiconductor device may be reflected, thereby increasing accuracy regarding the implemented modeled semiconductor shape.

The modeled semiconductor shape implemented through semiconductor shape modeling may be combined with process variables used in simulation of a physical thin film deposition operation and simulation of an etching operation to thereby extract a plurality of samples (S200). For example, a plurality of samples may be extracted via LHS. The extracted plurality of samples may be a plurality of modeled semiconductor shapes that are implemented through semiconductor shape modeling with respect to other process variables. For example, the extracted plurality of samples may be a plurality of modeled semiconductor shapes implemented through semiconductor shape modeling performed by varying a thickness of a thin film, a deposition time of the thin film, an etching depth and/or an etching time, and/or the like.

The number of extracted plurality of samples may be greater than the number of manufactured sample semiconductor devices. The number of extracted plurality of samples may be greater than the number of manufactured sample semiconductor devices by at least one order. For example, when the number of manufactured sample semiconductor devices is several to several tens, the number of extracted plurality of sample samples may be several hundreds to millions.

To perform optical analysis on each of the extracted plurality of samples, 3D shape meshing may be performed (S310). 3D shape meshing may be performed on the extracted plurality of samples such that meshes arranged at certain distances in a vertical direction (Z-direction of FIG. 4) are generated. The meshes may have a polygonal shape such as a quadrangle by cutting the extracted plurality of samples in a horizontal direction (X-Y direction of FIG. 4).

After performing 3D shape meshing (S310), the meshes may be combined and converted to voxels to which values are given on a regular grid in a three-dimensional space (S320).

A virtual spectrum is generated, through optical analysis, with respect to each of the extracted plurality of samples converted to the voxels (S410). A virtual spectrum may be generated by performing optical analysis on process steps selected from each of the extracted plurality of samples. That is, a plurality of virtual spectrums may be generated with respect to one extracted sample, by performing optical analysis on a structure on which each of the selected process steps is performed. A virtual spectrum may be generated by performing an operation through RCWA, which is a Fourier space analysis method of an FDFD. As the RCWA may be used in diffraction analysis of an electromagnetic wave according to repeated structures, a plurality of virtual spectrums may be generated by performing RCWA on the extracted plurality of samples converted to voxels.

In some embodiments, virtual spectrums may be repeatedly generated each time when each sample is extracted (S200). In other embodiments, virtual spectrums may be generated by extracting a plurality of samples (S200) and then performing a parallel operation thereon (S410).

By indexing the virtual spectrums (S420), input values to be used in shape prediction learning are generated. A virtual spectrum may be indexed by using FFT or PCA. An indexing process may also be performed on a sample spectrum measured with respect to a sample semiconductor device (S420).

By performing shape prediction learning by using an indexed virtual spectrum as an input and a modeled semiconductor shape, i.e., a target spec, as an output (S510), a shape prediction model 600, which is a result of learning, may be generated (S520) and stored. For example, by using values obtained by indexing virtual spectrums generated in selected process steps of each of the extracted plurality of samples, as an input, and a target spec of the selected process steps of each of the extracted plurality of samples, as an output, machine learning or deep learning may be performed to generate a shape prediction model 600 (S520).

While generating the shape prediction model 600 (S520), the shape prediction model 600 may be corrected (S550) by using a result of indexing of a sample spectrum measured from a sample semiconductor device and a measured sample shape (target spec). That is, the shape prediction model 600 may be generated (S520) by determining and correcting a compatibility between the target spec, which is the modeled semiconductor shape obtained in the semiconductor shape modeling for a virtual spectrum, and the measured sample shape (i.e., target spec) with respect to the sample spectrum measured from the sample semiconductor device.

After the shape prediction model 600 is generated, a semiconductor device is manufactured (S710). The semiconductor device may be manufactured using a designed semiconductor layout and/or by shrinking the designed semiconductor layout. In selected process steps of manufacturing a semiconductor device, an actual spectrum of a sample may be measured (S720). By inputting the measured actual spectrum to the shape prediction model 600, a target spec, which is a shape of a semiconductor device, may be predicted (S800).

In some embodiments, a shape (i.e., target spec) of some of the manufactured semiconductor devices may be measured (S730), and the predicted shape may be verified (S900). In accordance with the result of the verification of the predicted shape, semiconductor shape modeling may be performed again (S100). In this case, the manufactured semiconductor device, the shape of which is measured, may be used in the operation of performing semiconductor shape modeling (S100) and the operation of correcting a shape prediction model (S550) in the same manner as the manufactured sample semiconductor device (S50).

In the method of predicting a shape of a semiconductor device according to some embodiments, in the process of manufacturing a sample semiconductor device (S50), the number of actually manufactured and measured samples may be reduced or minimized and semiconductor shape modeling may be performed (S100) to extract a plurality of samples (S200). The extracted samples may be used in shape prediction learning for generating the shape prediction model 600 (S520), thereby increasing the accuracy of the shape prediction model for the shape prediction method of a semiconductor device and reducing the cost of a large amount of samples for analysis and the cost and time for destructive analysis of the samples. Particularly, after the shape prediction model 600 is generated (S520), the semiconductor shape may be monitored non-destructively without performing destructive analysis.

Figure 4:
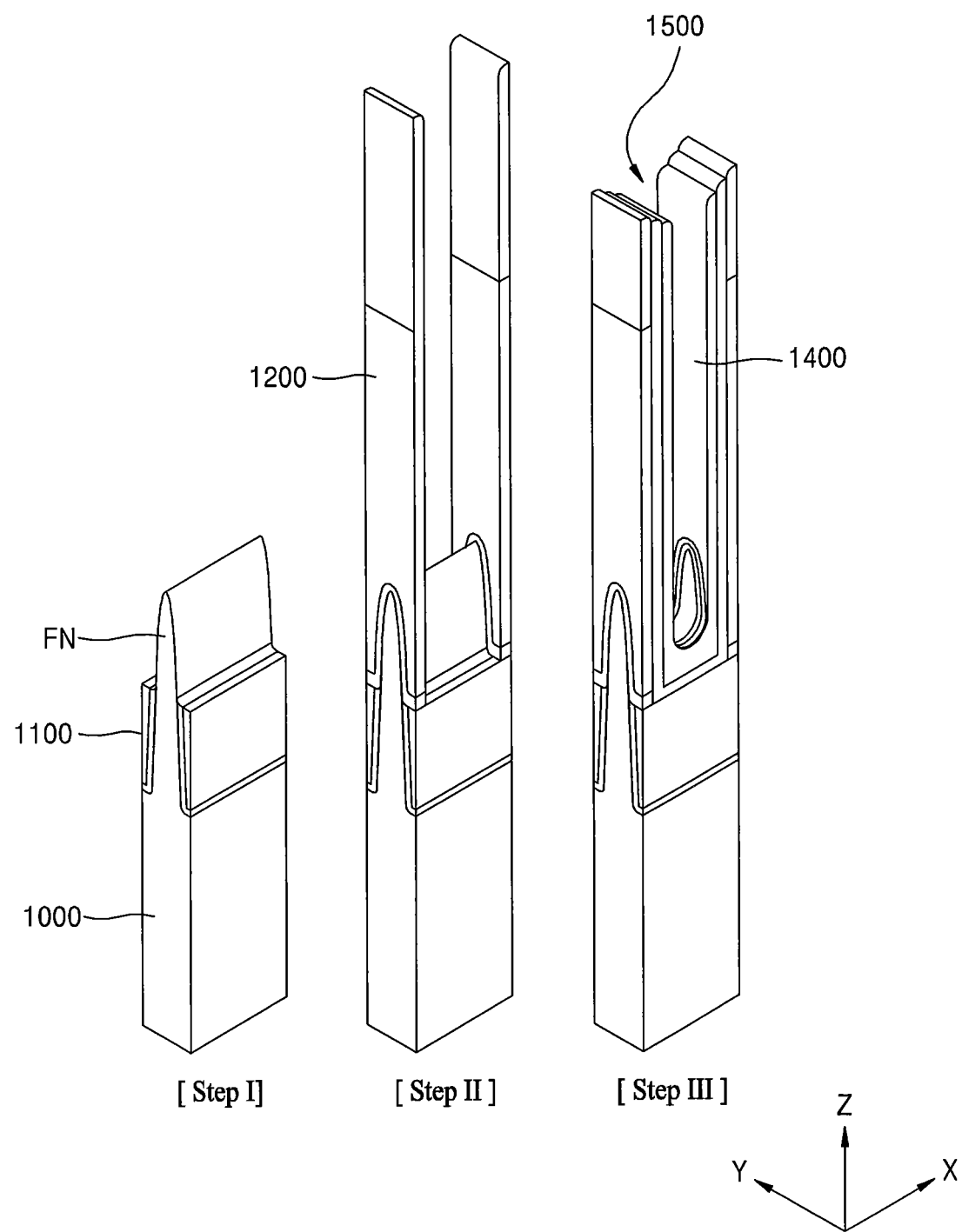
FIG. 4 is a diagram for describing a process of selecting a shape determining operation and modeling a semiconductor shape in a shape prediction method of a semiconductor device, according to some embodiments of the inventive concept.

FIG. 4 is a diagram for describing a process of selecting a shape determining operation and modeling a semiconductor shape in a shape prediction method of a semiconductor device, according to some embodiments of the inventive concept.

Referring to FIG. 4, from among process steps for manufacturing a FinFET semiconductor device, a shape determining process step may be selected. In the process of manufacturing a FinFET semiconductor device, a first step (Step I), a second step (Step II), and a third step (Step III) may be selected as shape determination process steps. It will be understood that, although the terms first, second, third, etc. may be used herein to describe various elements, and elements should not be limited by these terms; rather, these terms are only used to distinguish one element from another element. Thus, a first element discussed could be termed a second element without departing from the scope of the present inventive concepts.

For example, the first step (Step I) may be a step in which a device isolation film 1100 covering a fin FN and lower sidewalls of the fin FN is formed on a semiconductor substrate 1000. The semiconductor substrate 1000 may include, for example, silicon (Si). In some embodiments, the semiconductor substrate 1000 may include a semiconductor element such as germanium (Ge) or a compound semiconductor such as silicon carbide (SiC), gallium arsenide (GaAs), indium arsenide (InAs), and/or indium phosphide (InP).

For example, target specs measurable in the first step (Step I) may include a height of the fin FN in a vertical direction (Z-direction), a height of a portion of the fin FN protruding from a top surface of the device isolation film 1100, a length of the fin FN in a first horizontal direction (X-direction), a width of the fin FN such as a BCD, a MCD or a TCD in a second horizontal direction (Y-direction), an angle of a sidewall of the fin FN, a thickness of the device isolation film 1100, and/or the like.

For example, the second step (Step II) may be a step in which a gate line 1200 is formed. In some embodiments, the gate line 1200 may include a dummy gate line. For example, target specs measurable in the second step (Step II) may include a height of the gate line 1200 in the vertical direction (Z-direction), a BCD, a MCD, a TCD in the first horizontal direction (X-direction), and a width of the gate line 1200, a height and width, etc. of the fin FN exposed between two adjacent gate lines 1200, and/or the like.

For example, the third step (Step III) may be a step in which an etching operation of exposing a portion of the fin FN is performed to form a source and a drain by removing a portion between spacer layers 1400 covering the sidewalls of the gate line 1200. For example, target specs measurable in the third step (Step III) may include a depth of a space removed between the spacer layers 1400, a width of an exposed portion of the fin FN, and/or a depth of a removed portion of the fin FN.

The shape determining process steps and the target specs of the shape determining process steps described with reference to FIG. 4 are examples, and the embodiments described herein are not limited thereto.

Figure 5:
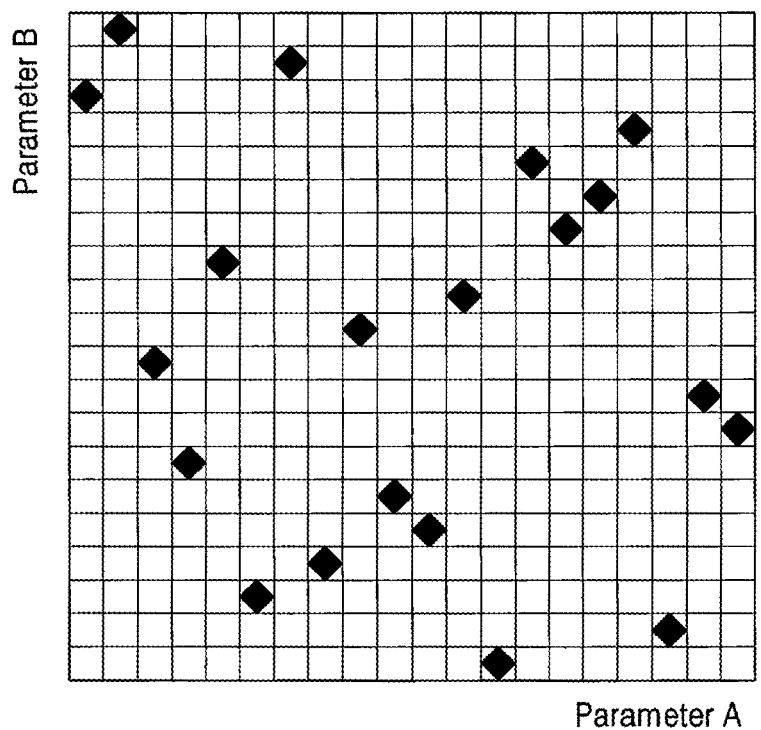
FIG. 5 is a diagram for describing an operation of extracting samples in a shape prediction method of a semiconductor device, according to some embodiments of the inventive concept.

FIG. 5 is a diagram for describing an operation of extracting a sample in a shape prediction method of a semiconductor device, according to some embodiments of the inventive concept. Extracting samples in a shape prediction method may be performed using LHS.

Referring to FIG. 5, the modeled semiconductor shape implemented through semiconductor shape modeling may be combined with process variables used in simulation of a physical thin film deposition operation and simulation of an etching operation to thereby extract a plurality of samples. For example, a plurality of samples may be extracted through an independent linear combination of process variables used in simulation of a physical thin film deposition operation and simulation of an etching operation. For example, a plurality of samples may be extracted via LHS.

For example, when a deposition time of one thin film deposition operation is set as parameter A, and an etching time of one etching operation is set as parameter B, the deposition time (Parameter A) and the etching time (Parameter B), which are process variables, may be each independently linearly combined to extract a plurality of samples. For example, when a modifiable deposition time (Parameter A) and a modifiable etching time (Parameter B) may be each divided into twenty values, and instead of extracting 20×20, that is, 400 samples, by sampling all of the twenty deposition times (Parameter A) and all of the twenty etching times (Parameter B), two deposition times different from each other from among the twenty deposition times (Parameter A) and two etching times different from each other from among the twenty etching times (Parameter B) may be each independently linearly combined to thereby extract twenty samples (♦). Thus, in the extracted plurality of samples (♦), repeated deposition times (Parameter A) or repeated etching times (Parameter B) may not be included. In other words, the plurality of samples may be extracted based on a reduced set of the etching times and deposition times.

While two types of process variables, i.e., process variables arranged two-dimensionally during extraction of a plurality of samples, are described above, this is an example provided for convenience of description, and process variables may be arranged multi-dimensionally. In this case, a plurality of samples may be extracted through a multi-dimensional independent linear combination of process variables by using a similar method.

Figure 6:
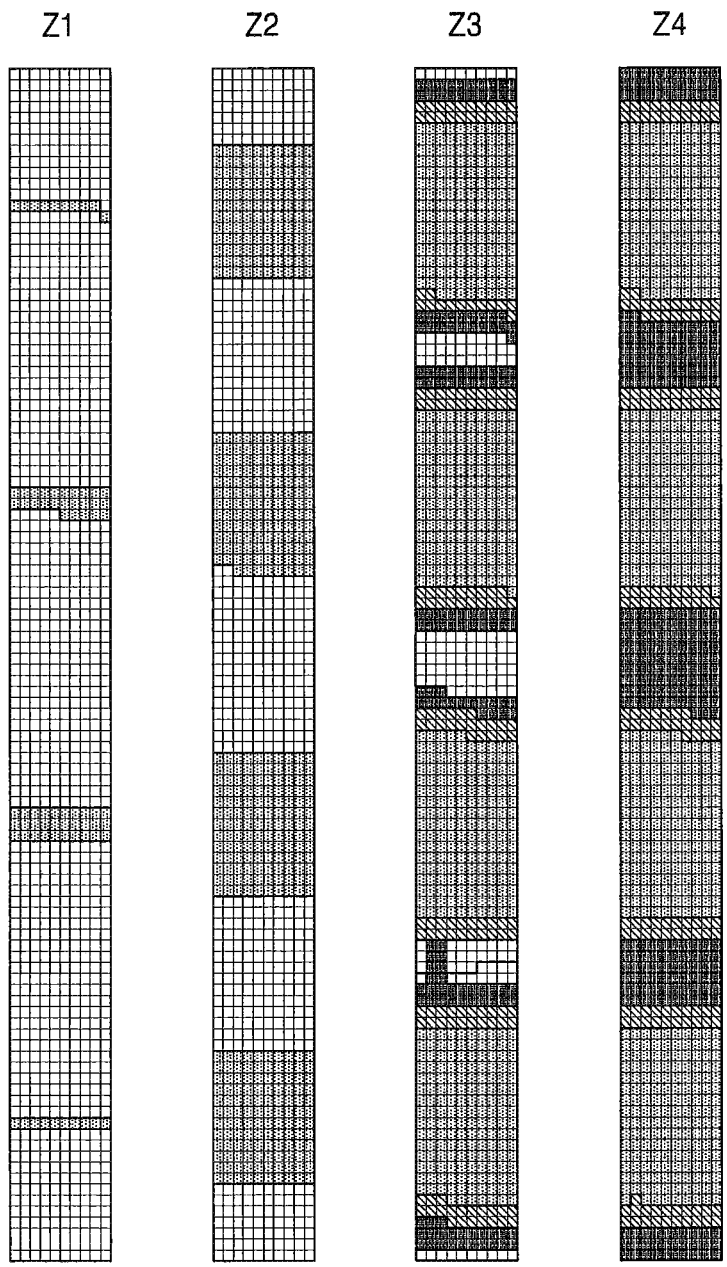
FIG. 6 is a diagram for describing a process of performing 3D shape meshing in a shape prediction method of a semiconductor device, according to some embodiments of the inventive concept.
Figure 6:
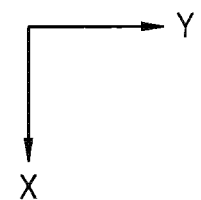

FIG. 6 is a diagram for describing a process of performing 3D shape meshing in a shape prediction method of a semiconductor device, according to some embodiments of the inventive concept.

Referring to FIG. 6, to perform optical analysis on each of the extracted plurality of samples, 3D shape meshing may be performed. 3D shape meshing may be performed on each of the extracted plurality of samples by selecting a plurality of Z-direction values (for example, heights Z1, Z2, Z3, and Z4) such that meshes arranged at certain distances in a vertical direction (Z-direction of FIG. 4) are generated, and by cutting the extracted plurality of samples in a horizontal direction (X-Y direction) such that the meshes have a polygonal shape such as quadrangle. Each of the meshes may be formed of a material that represents each mesh.

Next, the meshes may be combined to be converted to voxels to which values capable of representing materials representative of a regular grid in a three-dimensional space are given.

Figure 7:
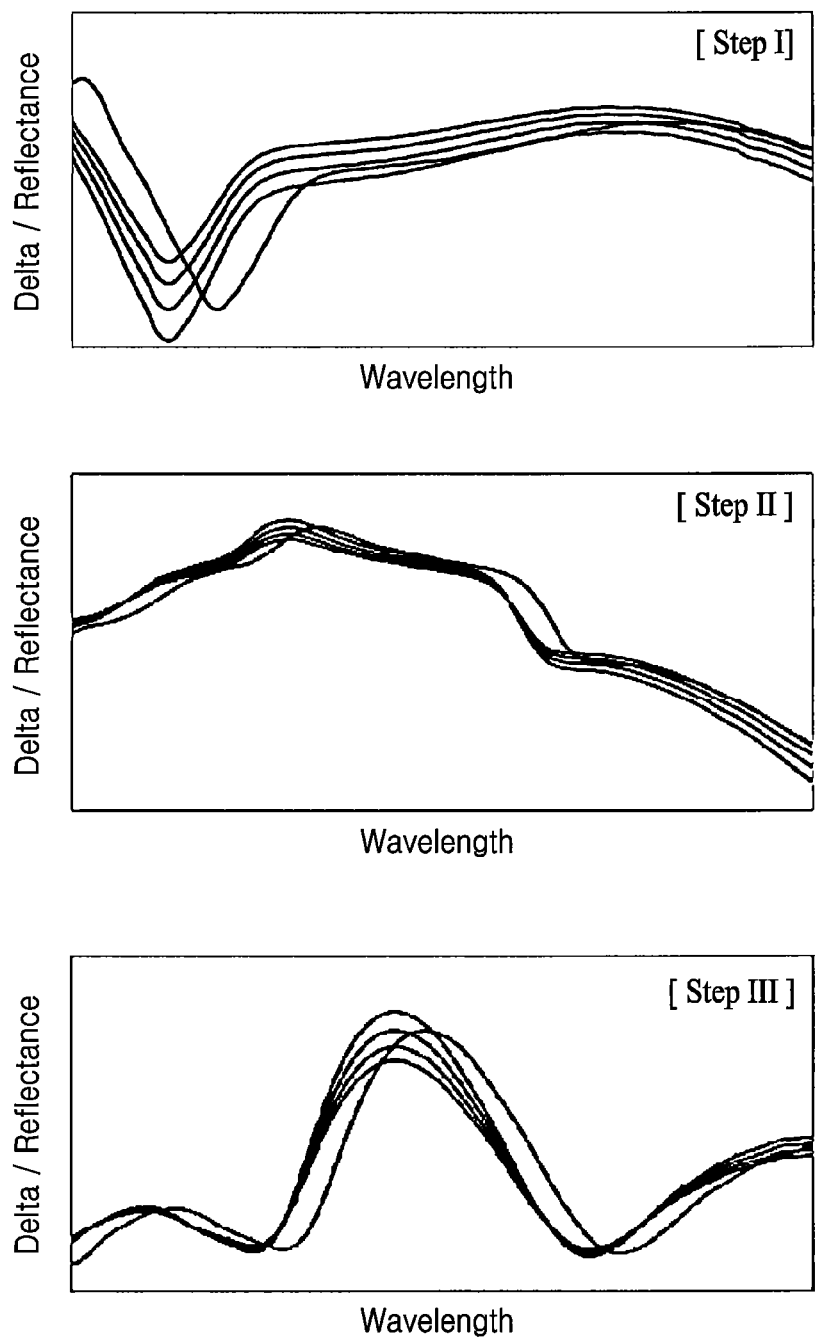
FIG. 7 is a diagram for describing a process of generating a virtual spectrum in a shape prediction method of a semiconductor device, according to some embodiments of the inventive concept.

FIG. 7 is a diagram for describing a process of generating a virtual spectrum in a shape prediction method of a semiconductor device, according to some embodiments of the inventive concept.

Referring to FIG. 7, a virtual spectrum is generated with respect to a plurality of samples converted to voxels in each of the plurality of shape determination process steps (Step I, Step II, and Step III).

A virtual spectrum may be in the form of a spectrum measured using a scatterometer such as spectroscopic ellipsometry or spectroscopic reflectometry. In some embodiments, a virtual spectrum generated in the form of a spectrum measured by spectroscopic ellipsometry may represent a phase difference (Delta) according to a wavelength. In other embodiments, a virtual spectrum generated in the form of a spectrum measured by spectroscopic reflectometry may represent a reflectance according to a wavelength.

A virtual spectrum may be generated by performing optical analysis on process steps selected from each of the extracted plurality of samples. That is, a plurality of virtual spectrums may be generated with respect to one extracted sample, by performing optical analysis on a structure on which each of the selected process steps is performed.

A virtual spectrum may be generated by performing an operation through RCWA, which is a Fourier space analysis method of an FDFD. In some embodiments, virtual spectrums regarding a plurality of samples may be generated by performing a parallel operation on the RCWA.

The FDFD is a numerical analysis method for solving problems of electromagnetic waves, which may be a method of solving a differential equation based on finite difference approximation of differential operators. The FDFD may be applied mainly to problems of scattering. The FDFD may be similar to a finite-difference time-domain (FDTD), and may be a method of converting a Maxwell's equation regarding sources and fields of a certain frequency, to a matrix form.

RCWA is used in diffraction analysis of an electromagnetic wave due to repeated structures and is an analysis algorithm that uses Maxwell's equations including boundary conditions. According to RCWA, an amplitude ratio ($\Psi$) and a phase difference (Δ) of a spectrum may be obtained from a phase shift of each of a TE mode and a TM mode and an amplitude ratio between the TE mode and the TM mode.

Figure 8A:
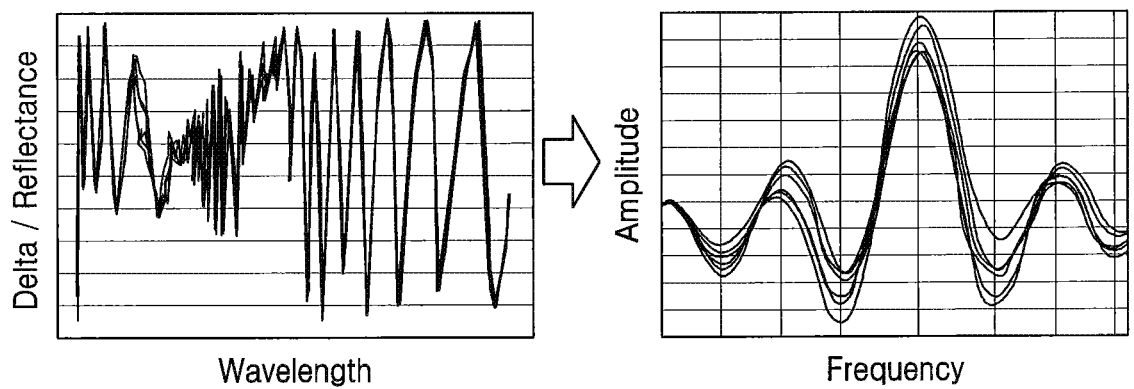
FIGS. 8A and 8B are each a diagram for describing an operation of performing virtual spectrum indexing in a shape prediction method of a semiconductor device, according to some embodiments of the inventive concept.
Figure 8B:
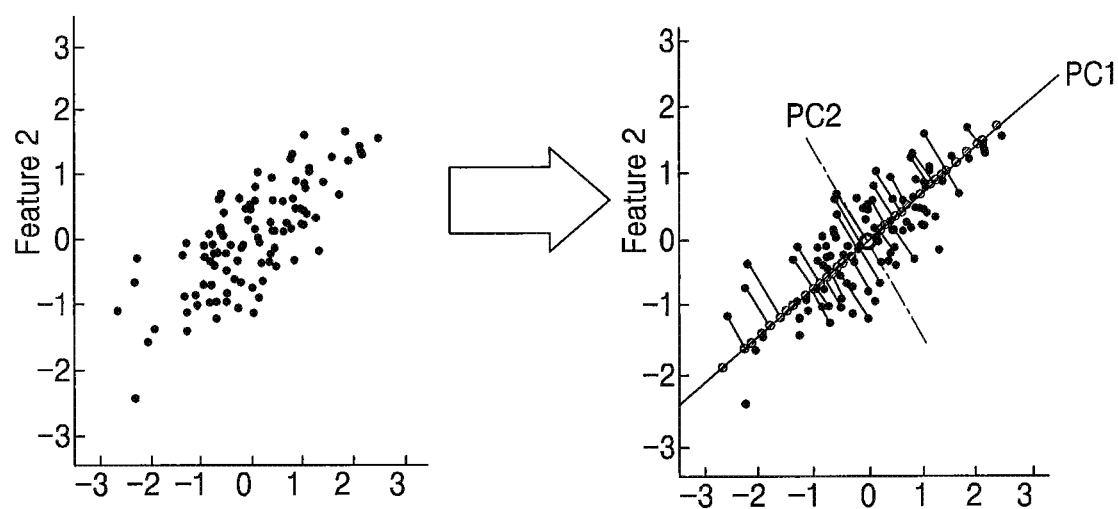

FIGS. 8A and 8B are each a graph for describing an operation of performing virtual spectrum indexing in a shape prediction method of a semiconductor device, according to some embodiments of the inventive concept.

Referring to FIG. 8A, generated virtual spectrums may be indexed using FFT. FFT is an algorithm conducting discrete Fourier Transform (DFT). For example, when conducting DFT on N data strings, $N^2$ multiplications of independently calculating a Fourier coefficient of each frequency may be needed. According to FFT, when N is factorized into prime factors, data strings thereof may be divided, and DFT may be performed on a prime number group corresponding to each prime factor, and N DFTs may be performed by using a result of the DFT, thereby reducing the number of operations.

In some embodiments, by performing FFT on virtual spectrums, one largest peak and/or two or more relatively large peaks may be selected to index the virtual spectrums.

Referring to FIG. 8B, generated virtual spectrums may be indexed using PCA.

PCA is a method of reducing high-dimensional data to lower-dimensional data. In PCA, orthogonal transformation may be used to convert samples of a high-dimensional space, which are likely to be correlated, to samples of a lower-dimensional space (principal component), which has little or no linear correlation. Dimensionality of a principal component may be equal to or less than that of an original sample. In PCA, linear transformation is performed on data to a new coordinate system such that, when data is mapped to one axis, an axis on which a variance of the data is maximized is set as a first principal component PC1, and an axis on which a variance of the data is maximized second is set as a second principal component PC2. As described above, according to PCA, components that most properly represent a difference in samples may be decomposed. In PCA, transformation is defined such that the first principal component PCI has a largest variance, and subsequent principal components have a next largest distribution under the restriction that the subsequent principal components intersect with previous principal components at right angles.

In some embodiments, virtual spectrums may be indexed by performing PCA on the virtual spectrums and detecting principal components. In FIG. 8B, two principal components (PC1, PC2) are illustrated as an example for convenience of illustration. The number of obtained principal components may be, for example, several tens or more.

Figure 9:
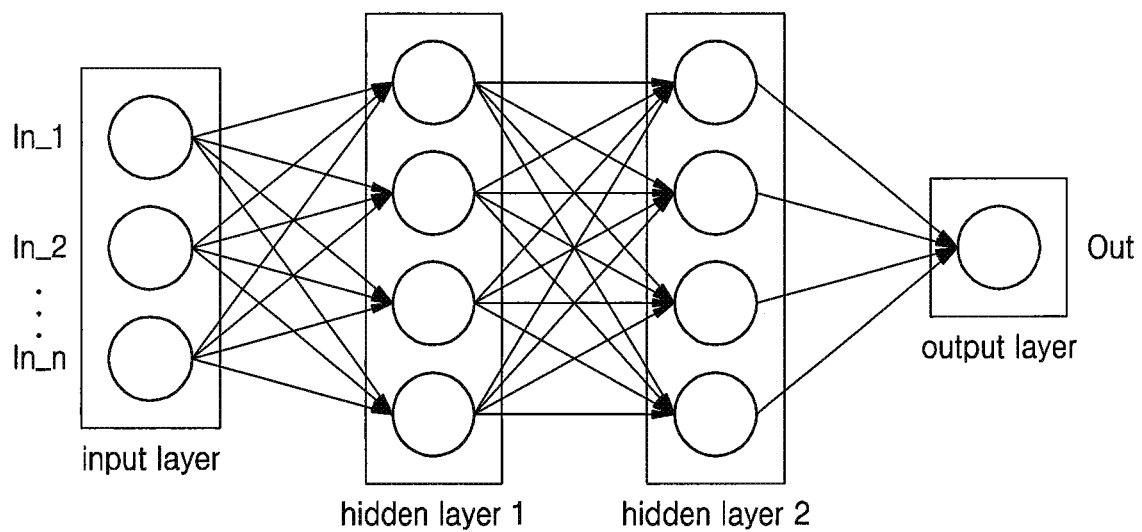
FIG. 9 is a diagram for describing an operation of performing shape prediction learning in a shape prediction method of a semiconductor device, according to some embodiments of the inventive concept.

FIG. 9 is a diagram for describing an operation of performing shape prediction learning in a shape prediction method of a semiconductor device, according to some embodiments of the inventive concept.

Referring to FIG. 9, by using the indexed virtual spectrums In_1, In_2, . . . In_n, as an input, and a modeled semiconductor shape obtained through semiconductor shape modeling, that is, a target spec, as an output, shape prediction learning may be performed. Shape prediction learning may be performed through machine learning or deep learning.

Shape prediction learning may be performed by machine learning such as decision tree learning, association rule learning, Artificial Neural Network (ANN), genetic algorithm, inductive learning, Support Vector Machine (SVM), cluster analysis, Bayesian network, reinforcement learning or the like, or by deep learning such as Deep Neural Network (DNN), Convolutional Neural Network (CNN), Recurrent Neural Network (RNN), Restricted Boltzmann Machine (RBM), Deep Belief Network (DBN), Deep Q-Networks, and/or the like.

For example, in machine learning or deep learning used to perform shape prediction learning, a neural network having multiple layers may be used. For example, a neural network having multiple layers may include an input layer, at least one hidden layer (hidden layer 1, hidden layer 2), and an output layer. When an indexed virtual spectrum (In_1, In_2, . . . In_n) is input to an input layer, the indexed virtual spectrum may pass at least one hidden layer (hidden layer 1, hidden layer 2) and then an output out may be provided to an output layer. In order that a target spec obtained through semiconductor shape modeling is provided as an output out, shape prediction learning may be performed by adjusting weights of nodes forming the at least one hidden layer (hidden layer 1, hidden layer 2).

In some embodiments, before performing shape prediction learning, in which an indexed virtual spectrum and a target spec obtained through semiconductor shape modeling are to be used, shape prediction learning performed using a sample spectrum and a sample shape (target spec) measured from a sample semiconductor device may be performed first.

For example, primary shape prediction learning may be performed by using a relatively small number of sample semiconductor devices to generate an approximate shape prediction model. Then secondary shape prediction learning may be performed by using a relatively large number of extracted samples to complete a shape prediction model having higher accuracy.

In some embodiments, shape prediction learning may also be performed by using both a relatively small number of sample semiconductor devices and a relatively large number of extracted samples.

Figure 10:
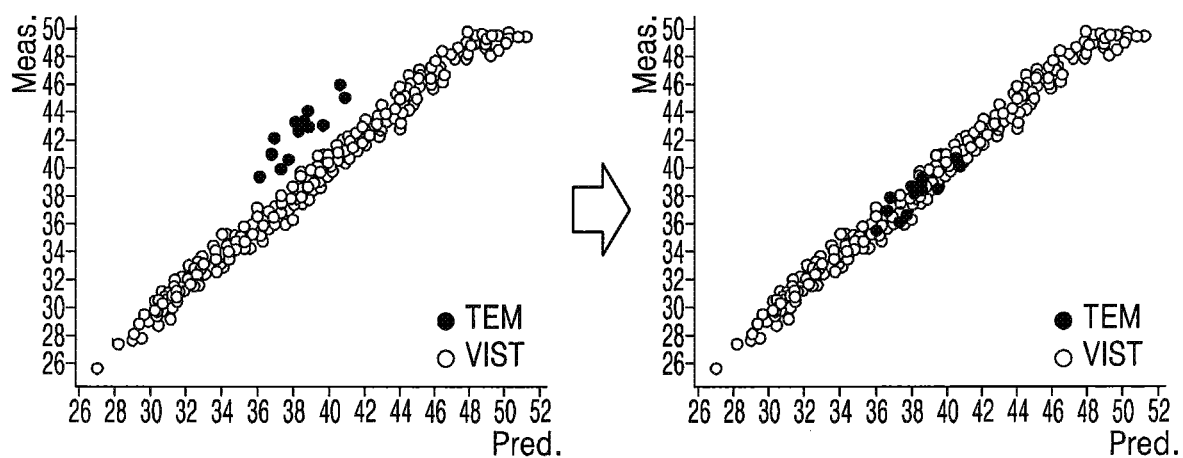
FIG. 10 is a diagram for describing a process of correcting a shape prediction model in a shape prediction method of a semiconductor device, according to some embodiments of the inventive concept.

FIG. 10 is a diagram for describing a process of correcting a shape prediction model in a shape prediction method of a semiconductor device, according to some embodiments of the inventive concept.

Referring to FIG. 10, also when a target spec (Meas.) obtained through semiconductor shape modeling from a plurality of samples (VIST) and a prediction value (Pred.) of a shape predicted from a shape prediction model by using a virtual spectrum approximately correspond to each other, in a sample semiconductor device (TEM), a sample shape (Meas.) obtained by actually measuring a sample semiconductor device and a prediction value (Pred.) of a shape predicted from a shape prediction model by using the actually measured sample spectrum may not correspond to each other. In this case, semiconductor shape modeling may be completed by performing correction such that the target spec (Meas.) and the prediction value (Meas.) of the shape correspond to each other both in the plurality of samples (VIST) and the sample semiconductor device (TEM). Correction of semiconductor shape modeling may be performed by performing learning both on target specs and virtual spectrums obtained through semiconductor shape modeling of a plurality of samples and actually measured sample shapes and actually measured sample spectrums of a sample semiconductor device.

Figure 11:
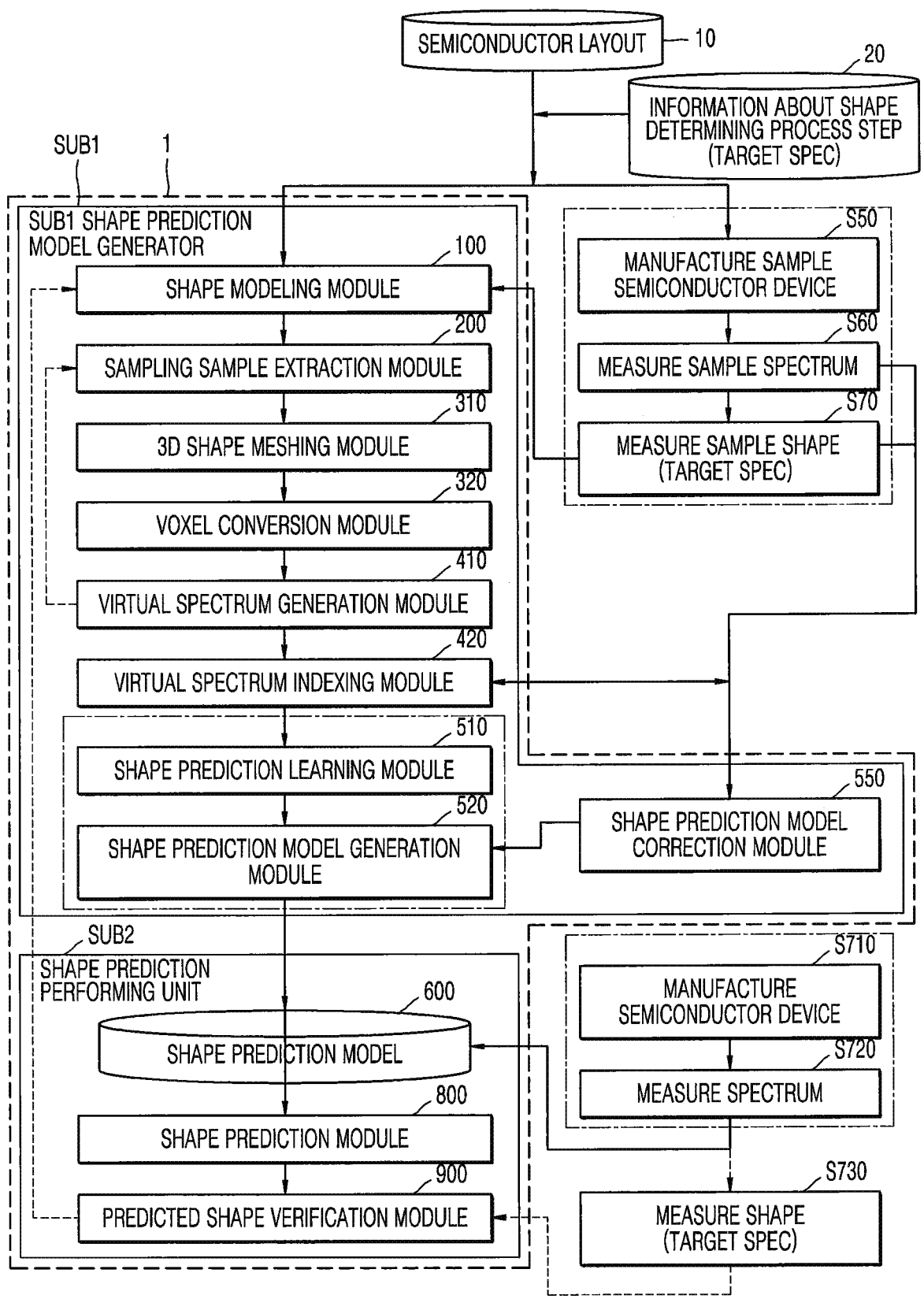
FIG. 11 is a diagram for describing a shape prediction system for performing a shape prediction method of a semiconductor device, according to some embodiments of the inventive concept.

FIG. 11 is a diagram for describing a shape prediction system for performing a shape prediction method of a semiconductor device, according to some embodiments of the inventive concept.

Referring to FIG. 11, the shape prediction system of a semiconductor device (hereinafter referred to as a shape prediction system 1) may include a shape prediction model generator SUB1 and a shape prediction performing unit SUB2.

The shape prediction model generator SUB1 may include a shape modeling module 100, a sample extracting module 200, a 3D shape meshing module 310, a voxel conversion module 320, a virtual spectrum generation module 410, a virtual spectrum indexing module 420, a shape prediction learning module 510, a shape prediction model generation module 520, and a shape prediction model correction module 550.

The shape prediction performing unit SUB2 may include a shape prediction module 800 performing shape prediction by using a shape prediction model 600 and/or a predicted shape verification module 900.

In some embodiments, the shape prediction model generator SUB1 and the shape prediction performing unit SUB2 may be configured as separate systems, and the shape prediction performing unit SUB2, which is a separate system, may receive the shape prediction model 600 generated in the shape prediction model generator SUB1 and perform shape prediction of a semiconductor device.

In some embodiments, the shape prediction model generator SUB1 and the shape prediction performing unit SUB2 may be configured as a single system, and may perform both generation of the shape prediction model 600 and shape prediction of a semiconductor device.

The shape prediction system 1 may receive a designed semiconductor layout 10 and information 20 about selected shape determining process steps (target spec) to generate the shape prediction model 600.

The shape modeling module 100 may implement a modeled semiconductor shape by performing semiconductor shape modeling through simulation of a physical thin film deposition operation and simulation of an etching operation based on a semiconductor layout.

By using a designed semiconductor layout, a sample semiconductor device may be manufactured (S50). In a process of manufacturing a sample semiconductor device, a sample spectrum may be measured in each of the shape determining process steps (S60), and a sample shape of a sample semiconductor device (target spec) may be measured (S70).

The shape modeling module 100 may increase accuracy regarding a modeled semiconductor shape implemented by referring to the sample shape (target spec) of the sample semiconductor device.

In some embodiments, the shape modeling module 100 may include a TCAD tool. In other embodiments, the shape modeling module 100 may perform a function of performing communication with a system providing a TCAD tool connected to the shape prediction system 1 via a network. In other words, the shape modeling module 100 may be remote from a system providing the TCAD tool The sample extraction module 200 may extract a plurality of samples by combining process variables used in simulation of a physical thin film deposition operation and simulation of an etching operation, with respect to a semiconductor shape of a modeled semiconductor shape implemented using the shape modeling module 100. For example, a plurality of samples may be extracted through an independent linear combination of the process variables. For example, a plurality of samples may be extracted via LHS.

The 3D shape meshing module 310 may perform 3D shape meshing on each of the extracted plurality of samples. The voxel conversion module 320 may combine meshes generated in the 3D shape meshing module 310 to convert the extracted plurality of samples to voxels to which values are given on a regular grid in a three-dimensional space.

The virtual spectrum generation module 410 may generate, through optical analysis, a virtual spectrum with respect to each of the plurality of samples converted to voxels. The virtual spectrum generation module 410 may perform optical analysis to generate virtual spectrums with respect to process steps selected from each of the plurality of samples converted to voxels. That is, the virtual spectrum generation module 410 may generate a plurality of virtual spectrums with respect to one sample converted to a voxel, by performing optical analysis on a structure in which each of the selected process steps is performed.

The virtual spectrum generation module 410 may generate a virtual spectrum by performing an operation through RCWA, which is a Fourier space analysis method of FDFD.

The virtual spectrum indexing module 420 may perform indexing to generate virtual spectrums generated using the virtual spectrum generation module 410, as input values to be used in shape prediction learning. The virtual spectrum indexing module 420 may index virtual spectrums by using FFT or PCA. In some embodiments, the virtual spectrum indexing module 420 may also index a sample spectrum measured with respect to a sample semiconductor device. In some embodiments, the sample spectrum measured with respect to the sample semiconductor device may be indexed using an additional spectrum indexing module and then may be provided to the shape prediction model correction module 550.

The shape prediction learning module 510 may perform shape prediction learning by using values obtained by indexing a virtual spectrum. This may be performed using the virtual spectrum indexing module 420, as an input value, and a modeled semiconductor shape of each of the plurality of samples may be provided as an output.

A result of shape prediction learning performed using the shape prediction learning module 510 may be generated as the shape prediction model 600 by the shape prediction model generation module 520. The shape prediction model 600 may be a storage space storing a shape prediction model.

The shape prediction model correction module 550 may correct the shape prediction model 600 generated by the shape prediction model generation module 520, by using a result of indexing of the sample spectrum measured from the sample semiconductor device and the measured sample shape (target spec). The shape prediction model correction module 550 may correct the shape prediction model 600 by determining compatibility between the target spec which is the modeled semiconductor shape obtained in semiconductor shape modeling for a virtual spectrum and the measured sample shape (target spec) with respect to the sample spectrum measured from the sample semiconductor device.

The shape prediction module 800 may perform shape prediction by using the shape prediction model 600. In the operation of manufacturing of a semiconductor device (S710), a spectrum may be measured from each of the selected shape determining process steps (S720), and then the shape prediction module 800 may input a result obtained by indexing the measured spectrum to the shape prediction model 600 and predict a shape of the manufactured semiconductor device in a non-destructive manner.

In some embodiments, by using destructive analysis such as TEM, SEM, AFM, or the like on some of the manufactured semiconductor devices, a shape of the semiconductor devices (target spec) may be measured (S730), and the predicted shape verification module 900 may compare the shape of the measured shape of the semiconductor device with the shape predicted using the shape prediction module 800. The shape prediction model 600 may be corrected based on a result of comparing, performed by the predicted shape verification module 900. The predicted shape predicted using the shape prediction module 800 may be compared with the measured shape of the semiconductor device. That is, when the result of comparing, performed by the predicted shape verification module 900, of the predicted shape predicted using the shape prediction module 800, compared with the measured shape of the semiconductor device, exceeds an error range, the shape modeling module 100 may perform another semiconductor shape modeling. Then learning may be performed on the shape prediction model 600 again in the above-described process to thereby correct the shape prediction model 600.

According to the shape prediction system 1 of a semiconductor device according to the inventive concept, while manufacturing a sample semiconductor device (S50), the number of samples that are actually manufactured and measured may be reduced or minimized, and a plurality of samples may be extracted using the shape modeling module 100 and the sample extracting module 200. The shape prediction learning module 510 may perform learning by using a plurality of samples which are more than the number of samples that are actually manufactured and measured. The shape prediction model generation module 520 may generate the shape prediction model 600, and thus, the accuracy of shape prediction learning for generating the shape prediction model 600 may be increased. Thus, when generating the shape prediction model 600, a large amount of analysis samples and the cost and time for destructive analysis of the samples may not be needed or may be reduced, and a semiconductor shape may be monitored non-destructively.

While the inventive concept has been particularly shown and described with reference to embodiments thereof, it will be understood that various changes in form and details may be made therein without departing from the spirit and scope of the following claims.

What is claimed is:

1. A method of predicting a shape of a semiconductor device, the method comprising:
   implementing a modeled semiconductor shape with respect to a designed semiconductor layout;
   extracting a plurality of samples by independently linearly combining process variables with respect to the modeled semiconductor shape;
   generating virtual spectrums with respect to ones of the plurality of samples that were extracted through optical analysis;
   indexing the virtual spectrums to produce indexed virtual spectrums;
   generating a shape prediction model by using the indexed virtual spectrums as an input and the modeled semiconductor shape as an output; and
   indexing a spectrum measured from a manufactured semiconductor device and inputting the spectrum that was measured to the shape prediction model to predict a shape of the manufactured semiconductor device.

2. The method of claim 1, wherein the extracting of the plurality of samples is performed by Latin Hypercube Sampling (LHS).

3. The method of claim 1, further comprising:
   combining meshes generated through Three-Dimensional (3D) shape meshing with respect to the ones of the plurality of samples that were extracted; and
   converting the meshes to voxels,
   wherein the generating of the virtual spectrums comprises performing an operation on the ones of the plurality of samples converted to voxels, by using Rigorous Coupled Wave Analysis (RCWA), and
   wherein RCWA comprises a Fourier spatial interpretation method of Finite-Difference Frequency-Domain (FDFD).

4. The method of claim 1,
   wherein the indexing of the virtual spectrums comprises indexing the virtual spectrums by using Fast Fourier Transform (FFT) or Principal Component Analysis (PCA).

5. The method of claim 4,
   wherein the generating of the shape prediction model comprises inputting peaks selected through Fast Fourier Transform (FFT) on the virtual spectrums to the shape prediction model.

6. The method of claim 4,
   wherein the generating of the shape prediction model comprises inputting principal components obtained by performing PCA on the virtual spectrums to the shape prediction model.

7. The method of claim 1,
wherein the spectrum measured from the manufactured semiconductor device is measured using spectroscopic ellipsometry or spectroscopic reflectometry, and
wherein in the generating of the virtual spectrums, the virtual spectrums are generated in the form of a spectrum measured by spectroscopic ellipsometry or spectroscopic reflectometry.

8. The method of claim 1, further comprising:
manufacturing a sample semiconductor device by using the designed semiconductor layout,
wherein the implementing the modeled semiconductor shape comprises reflecting a sample shape measured from the sample semiconductor device.

9. The method of claim 8, further comprising:
correcting the shape prediction model by comparing a shape of the sample semiconductor device predicted by indexing the spectrum measured from the sample semiconductor device and input to the shape prediction model, with the sample shape that was measured.

10. The method of claim 1,
wherein the implementing the modeled semiconductor shape is performed through simulation of a physical thin film deposition operation and simulation of an etching operation,
wherein the extracting the plurality of samples by independently linearly combining process variables comprises determining independent linear combination of process variables,
wherein the independent linear combination of process variables comprise deposition times associated with the physical thin film deposition operation and etching times associated with the etching operation, and
wherein the plurality of samples are extracted based on a reduced set of etching times and/or deposition times.

11. A method of predicting a shape of a semiconductor device, the method comprising:
designing a designed semiconductor layout;
selecting a shape determining process from the designed semiconductor layout;
manufacturing a sample semiconductor device by using the designed semiconductor layout,
implementing a modeled semiconductor shape through simulation of a physical thin film deposition operation and simulation of an etching operation with respect to the designed semiconductor layout;
extracting a plurality of samples with respect to the modeled semiconductor shape;
generating virtual spectrums corresponding to the shape determining process that was selected, with respect to each of the plurality of samples that were extracted through optical analysis;
indexing the virtual spectrums;
generating a shape prediction model by performing learning by using the virtual spectrums that were indexed as an input and the modeled semiconductor shape as an output;
correcting the shape prediction model by comparing compatibility between a shape of the sample semiconductor device predicted by indexing the spectrum measured from the sample semiconductor device and input to the shape prediction model, and a sample shape measured from the sample semiconductor device; and
indexing a spectrum measured from a manufactured semiconductor device and inputting the spectrum to the shape prediction model to predict a shape of the manufactured semiconductor device.

12. The method of claim 11, wherein a number of the plurality of samples that were extracted is greater than a number of manufactured sample semiconductor devices by at least one order.

13. The method of claim 12, wherein the generating the shape prediction model comprises performing shape prediction learning through machine learning or deep learning.

14. The method of claim 11, wherein the extracting the plurality of samples is performed through Latin Hypercube sampling and/or through an independent linear combination of process variables in the shape determining process.

15. The method of claim 11, further comprising:
performing Three-Dimensional (3D) shape meshing on ones of the plurality of samples such that meshes arranged at distances in a vertical direction are generated, wherein the meshes have a quadrangular shape by cutting the plurality of samples in a horizontal direction; and
combining the meshes to convert the meshes to voxels to which values are given on a regular grid in a dimensional space,
wherein the generating of the virtual spectrums comprises performing optical analysis on the ones of the plurality of samples converted to voxels.

16. The method of claim 11, wherein the implementing of the modeled semiconductor shape is performed using Technology Computer Aided Design (TCAD).

17. A method of predicting a shape of a semiconductor device, the method comprising:
manufacturing a sample semiconductor device by using a designed semiconductor layout, for which a shape determining process is selected;
implementing a modeled semiconductor shape through simulation of a physical thin film deposition operation and simulation of an etching operation with respect to the designed semiconductor layout;
extracting, with respect to the modeled semiconductor shape, a plurality of samples which is more than a number of manufactured sample semiconductors by at least one order, through an independent linear combination of process variables in the shape determining process;
generating a shape prediction model by performing learning by using, as an input, indexed virtual spectrums with respect to ones of the plurality of samples that were extracted, and the modeled semiconductor shape as an output; and
indexing a spectrum measured from a manufactured semiconductor device and inputting the indexed spectrum to the shape prediction model to predict a shape of the manufactured semiconductor device.

18. The method of claim 17,
wherein the sample shape measured from the sample semiconductor device is reflected, and
wherein the shape prediction model is corrected by comparing compatibility between a shape of the sample semiconductor device predicted by indexing the spectrum measured from the sample semiconductor device and input to the indexed spectrum to the shape prediction model, with the sample shape measured from the sample semiconductor device.

19. The method of claim 18, wherein the sample shape measured from the sample semiconductor device is a numerical value indicating a Three-Dimensional (3D) shape of the sample semiconductor device measured using Transmission Electron Microscopy (TEM).

20. The method of claim 18,
wherein the spectrum measured from the manufactured semiconductor device is measured using a scatterometer, and
wherein the indexed virtual spectrums are generated as a spectrum measured using a scatterometer.

\* \* \* \* \*